US008074530B2

(12) United States Patent
Hino

(10) Patent No.: US 8,074,530 B2
(45) Date of Patent: Dec. 13, 2011

(54) HUB TRANSMISSION ASSEMBLY

(75) Inventor: Tetsuya Hino, Osaka (JP)

(73) Assignee: Shimano Inc., Osaka (JP)

( * ) Notice: Subject to any disclaimer, the term of this patent is extended or adjusted under 35 U.S.C. 154(b) by 477 days.

(21) Appl. No.: 12/422,090

(22) Filed: Apr. 10, 2009

(65) Prior Publication Data

US 2010/0261570 A1    Oct. 14, 2010

(51) Int. Cl.
*F16H 59/70* (2006.01)
*F16H 57/08* (2006.01)

(52) U.S. Cl. .......................... 74/335; 475/349

(58) Field of Classification Search ............ 475/349
See application file for complete search history.

(56) References Cited

U.S. PATENT DOCUMENTS

| 4,694,708 A * | 9/1987 | Hartmann ............... 475/269 |
|---|---|---|
| 5,863,270 A | 1/1999 | Chen et al. | |
| 6,267,704 B1 | 7/2001 | Patterson et al. | |
| 2002/0183159 A1* | 12/2002 | Okochi ..................... 475/269 |
| 2003/0040397 A1* | 2/2003 | Wu ........................... 475/269 |
| 2009/0005210 A1 | 1/2009 | Fukui et al. | |
| 2009/0005211 A1 | 1/2009 | Hino | |
| 2009/0023542 A1 | 1/2009 | Hino | |

* cited by examiner

*Primary Examiner* — Edwin A Young
(74) *Attorney, Agent, or Firm* — Global IP Counselors, LLP

(57) ABSTRACT

A multi-speed internal bicycle hub transmission assembly includes a stationary hub axle, a driver, a hub shell, a power transmission mechanism and a shift control mechanism. The stationary hub axle includes a positioner that is movable in a radial direction. The driver and the hub shell are rotatably supported to the hub axle. The power transmission mechanism is operably disposed between the driver and the hub shell for transmitting rotational power from the driver to the hub shell through a plurality of power transmission paths. The shift control mechanism includes a pawl control member movable in rotational directions relative to the hub axle to a plurality of orientations. Each orientation corresponds to selection of a corresponding one of the plurality of power transmission paths of the power transmission mechanism. The positioner is disposed to urge the pawl control member to remain the selected orientation.

18 Claims, 16 Drawing Sheets

HUB TRANSMISSION ASSEMBLY

BACKGROUND OF THE INVENTION

1. Field of the Invention

This invention generally relates to an internal transmission hub assembly. More specifically, the present invention relates to an internal transmission hub assembly that includes an internal positioning member.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle internal transmission hub assembly.

The internal transmission hub assembly is typically a rear wheel hub that includes an internal gearing mechanism that can be shifted to provide a plurality of power transmission paths (gear ratios) for a cyclist.

With such an internal transmission hub assembly, a cyclist changes pedaling speeds by manipulating a conventional lever actuating shifting mechanism installed on or adjacent to the handlebars of the bicycle. Movement of the lever actuating shifting mechanism is transmitted to the internal transmission hub assembly by a Bowden-type cable that is operably connected to a shift mechanism within the internal transmission hub assembly. Changes in the position of the lever actuating shifting mechanism cause corresponding changes in the selection of a power transmission path (gear ratio).

A problem with such an internal transmission hub assembly and conventional lever actuating shifting mechanism is that positioning of the elements within the internal transmission hub assembly is accomplished solely by the positioning of the lever actuating shifting mechanism and the cable. If the lever actuating shifting mechanism is not set to exactly the correct position or orientation, the appropriate elements within in the internal transmission hub assembly may not properly align. Such an improper alignment of elements within the internal transmission hub assembly requires minute movements of the conventional lever actuating shifting mechanism in order for the desired selection of power transmission paths.

Internal transmission hub assemblies typically include a pawl control member that is shaped and dimensioned to move along an arcuate path around a hub axle. The pawl control member includes at least one control arm with pawl contacting recesses that engage and disengage one-way clutch pawls, thereby providing a means to select a desired power transmission path. Recently, a positioning mechanism has been developed that includes a ring with a plurality of gear teeth that contacts a protrusion at an axial end of the pawl control member. Internal transmission hub assemblies are typically compact mechanisms. A problem with the above described positioning mechanism is that the overall volume of the internal transmission hub assembly must be increased slightly to accommodate the positioning mechanism.

In view of the above, it will be apparent to those skilled in the art from this disclosure that there exists a need for an improved internal transmission hub assembly that includes a more consistent means for establishing correct and complete shifting of the internal transmission hub assembly in the selection of the desired power transmission paths. This invention addresses this need in the art as well as other needs, which will become apparent to those skilled in the art from this disclosure.

SUMMARY OF THE INVENTION

One object of the present invention is to provide an internal transmission hub assembly with an internal positioning mechanism that ensures correct orientation of all elements that create a selected power transmission path.

Another object of the present invention is to provide an internal transmission hub assembly with reliable and accurate shifting between power transmission paths.

Yet another object of the present invention is to provide an internal transmission hub assembly with a positioning mechanism that does not increase the overall size or volume of the internal transmission hub assembly.

The foregoing objects can basically be attained by providing a multi-speed internal bicycle hub transmission assembly with a stationary hub axle, a driver, a hub shell, a power transmission mechanism and a shift control mechanism. The stationary hub axle includes a positioner that is movable in a radial direction relative to the stationary hub axle. The driver is rotatably supported to the hub axle and the hub shell rotatably is supported to the hub axle. The power transmission mechanism is operably disposed between the driver and the hub shell for transmitting rotational power from the driver to the hub shell through a plurality of power transmission paths. The shift control mechanism includes a pawl control member movable in rotational directions relative to the hub axle to a plurality of orientations. Each of the orientations corresponds to selection of a corresponding one of the plurality of power transmission paths of the power transmission mechanism. The positioner is disposed to urge the pawl control member to remain at any selected one of the orientations.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
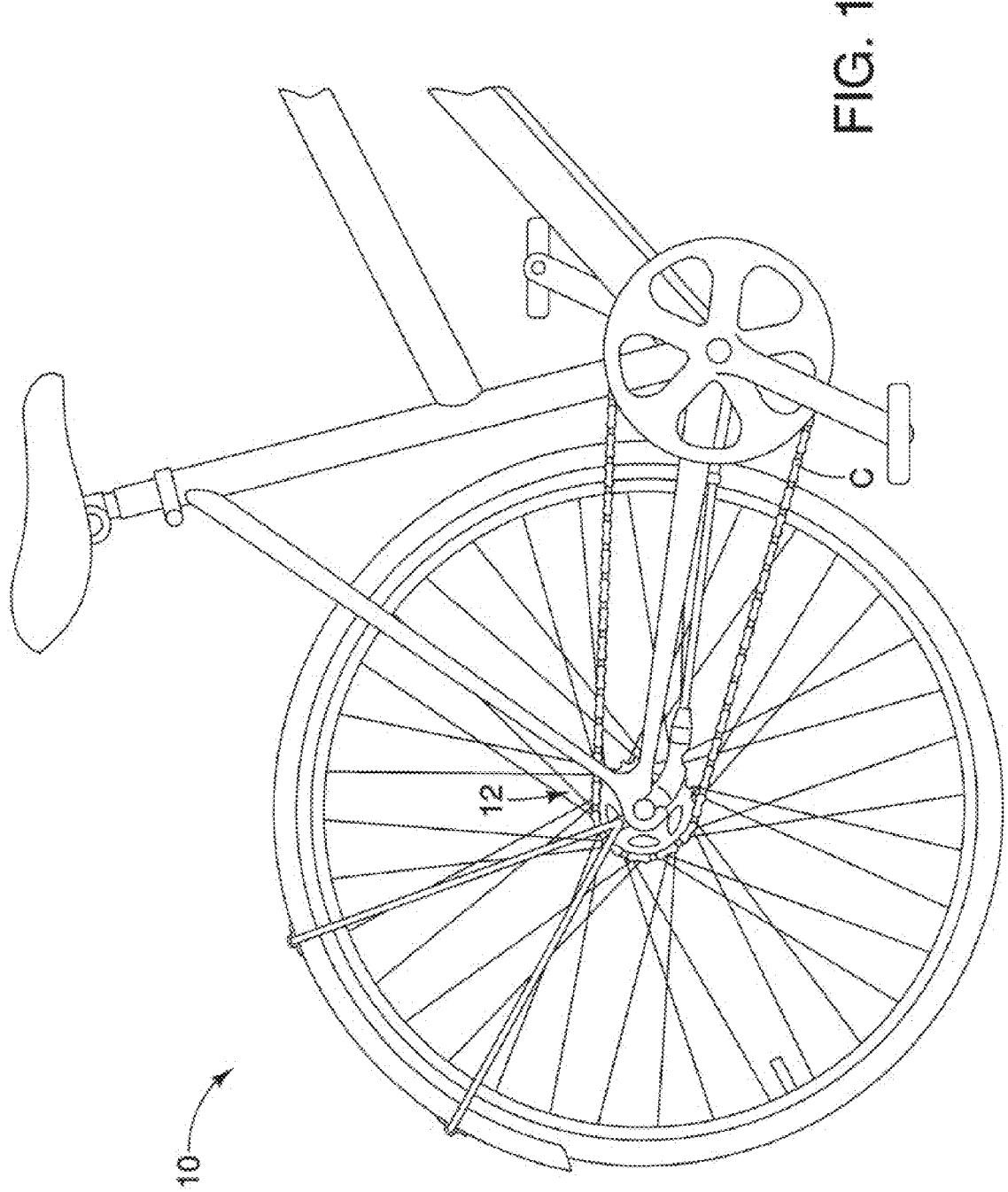
FIG. 1 is a fragmentary side elevation of a bicycle, showing a rear portion of the bicycle with a hub assembly in accordance with the present invention.

Referring initially to FIG. 1, a bicycle 10 with a hub assembly 12 is illustrated in accordance with a first embodiment of the present invention.

Figure 2:
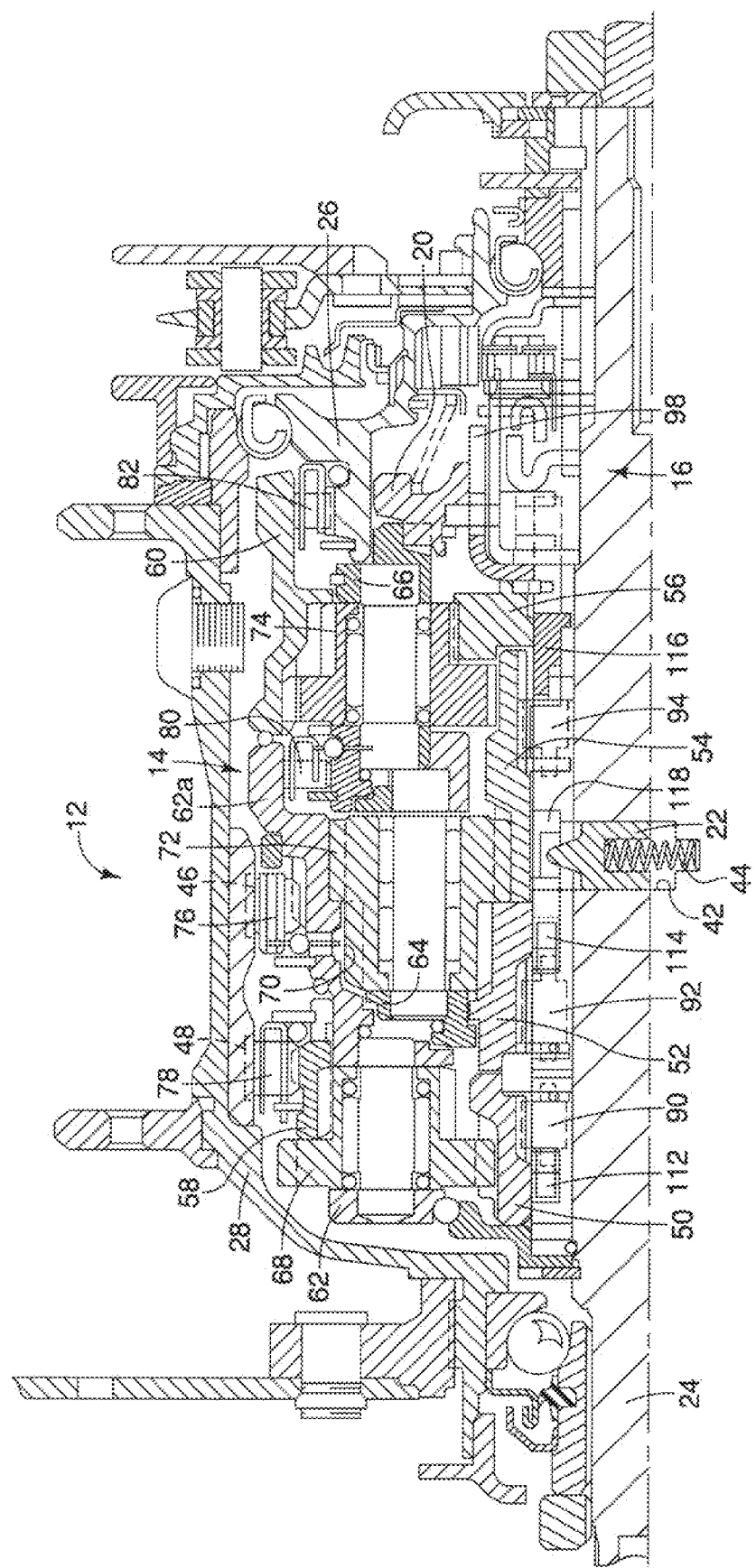
FIG. 2 is a cross-sectional view of the hub assembly removed from the bicycle, showing elements of a power transmission assembly, a shift control mechanism and a positioner in accordance with a first embodiment of the present invention.

As shown in FIG. 2, the hub assembly 12 includes a power transmission assembly 14 with a shift control mechanism 16 that controls movement of a pawl control member 18 and a clutch ring 20. The pawl control member 18 and the clutch ring 20 are selectively movable to a plurality of positions in order to configure various elements of the power transmission assembly 14 to transmit torque along a plurality of power transmission paths indicated in FIGS. 7-17 and described in greater detail below. Further, the hub assembly 12 of present invention includes a positioner 22 configured to accurately locate the pawl control member 18 to discreet positions corresponding to the plurality of power transmission path selectable by a cyclist.

As shown in FIG. 2, the hub assembly 12 basically includes a hub axle 24, a driver 26, a hub shell 28, the power transmission assembly 14 and the shift mechanism 16. The hub axle 24 is a stationary hub axle because when installed on the bicycle 10, the hub axle 24 remains stationary relative to the bicycle 10 with the driver 26 and the hub shell 28 being rotatable about the hub axle 24.

Figure 3:
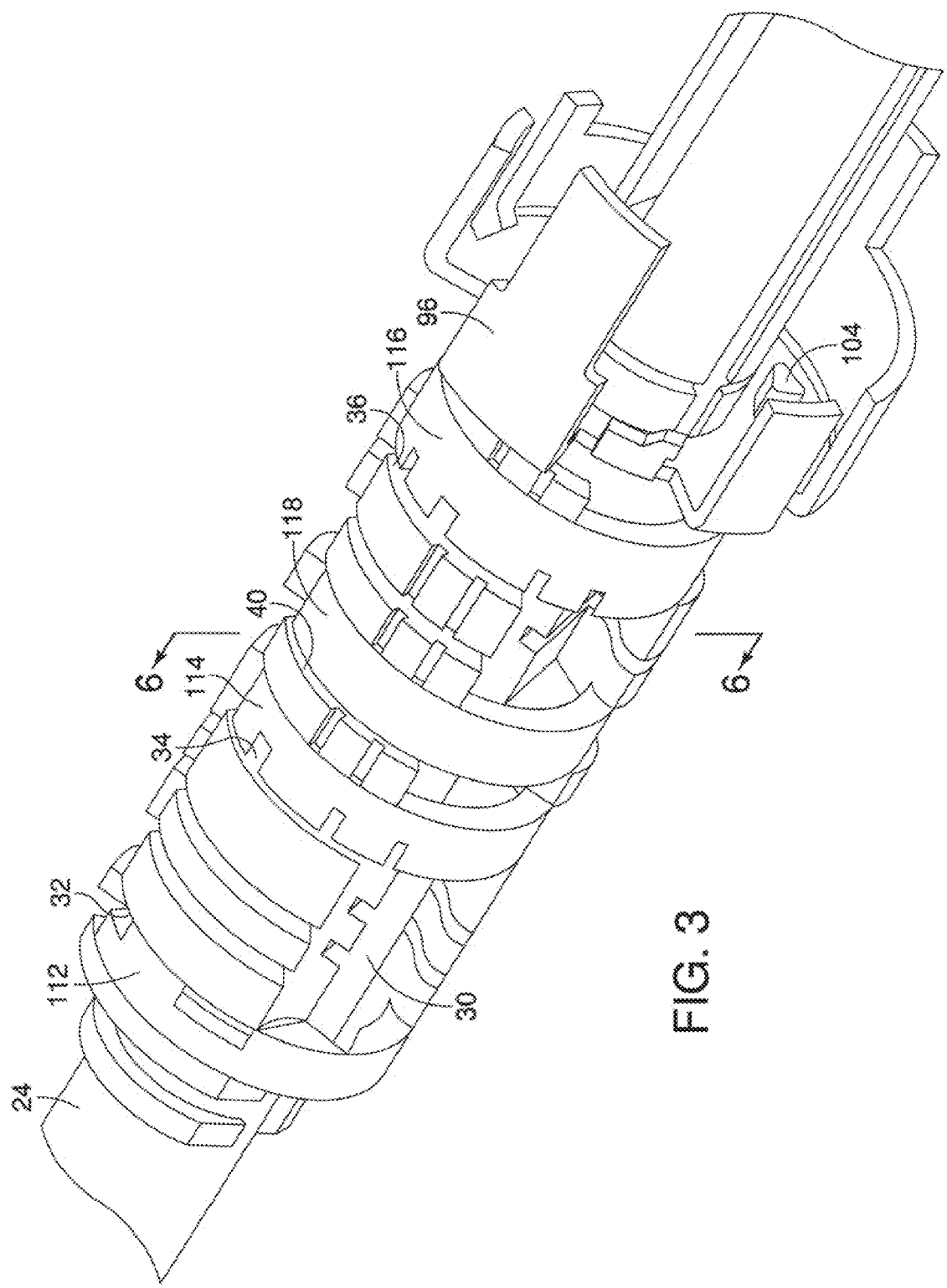
FIG. 3 a perspective view of a portion of the shift control mechanism of the hub assembly showing a hub axle, a pawl control member and a shift key guide in accordance with a first embodiment of the present invention.

The power transmission mechanism 14 of the hub assembly 12 is operably disposed between the driver 26 and the hub shell 28 for transmitting rotational power from the driver 26 to the hub shell 28 through the plurality of power transmission paths As indicated in FIG. 3, the hub axle 24 includes many conventional features, such as a pawl receiving groove 30 and pawl control arm receiving recesses 32, 34 and 36. The pawl receiving groove 30 extends in an axial direction along an outer circumferential surface of the hub axle 24. The pawl control and receiving recesses 32, 34 and 36 extend parallel to one another in a circumferential direction around an outer circumference of the hub axle 24. The hub axle 24 is further dimensioned to allow the pawl control member 18 to move in a circumferential direction about the hub axle 24 in order to engage corresponding portions of the power transmission assembly 14 in order to select the desired power transmission path. Since the pawl receiving groove 30 and the pawl control arm receiving recesses 32, 34 and 36 are conventional features well known in the art, description of these features is omitted for the sake of brevity.

Those features of the hub axle 24 that are new and related to the present invention are now described. As shown in FIG. 3, the hub axle 24 includes a positioning arm recess 40 that extends in the circumferential direction parallel to the pawl control arm receiving recesses 32, 34 and 36, but is located between the pawl control arm receiving recesses 32 and 34. As best shown in FIG. 2, the hub axle 24 also includes a radially extending bore 42 that has a closed end within the hub axle 24 and an open end that is open to the positioning arm recess 40.

Figure 5:
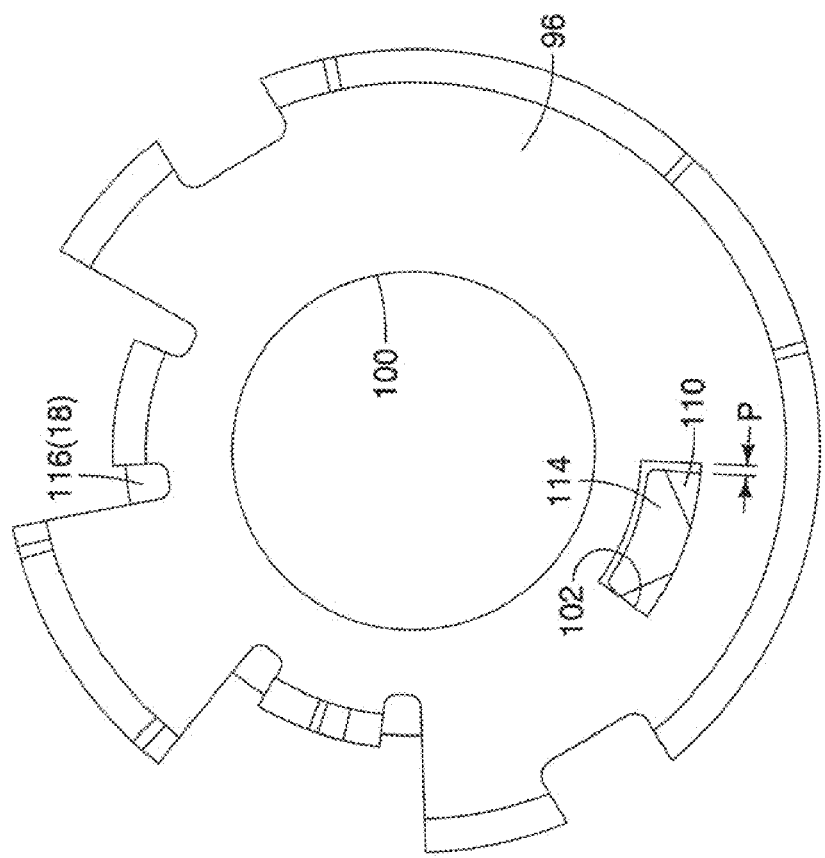
FIG. 5 is an end view of the shift key guide and the pawl control member showing the mechanical connection between the shift key guide and the pawl control member in accordance with a first embodiment of the present invention.
Figure 7:
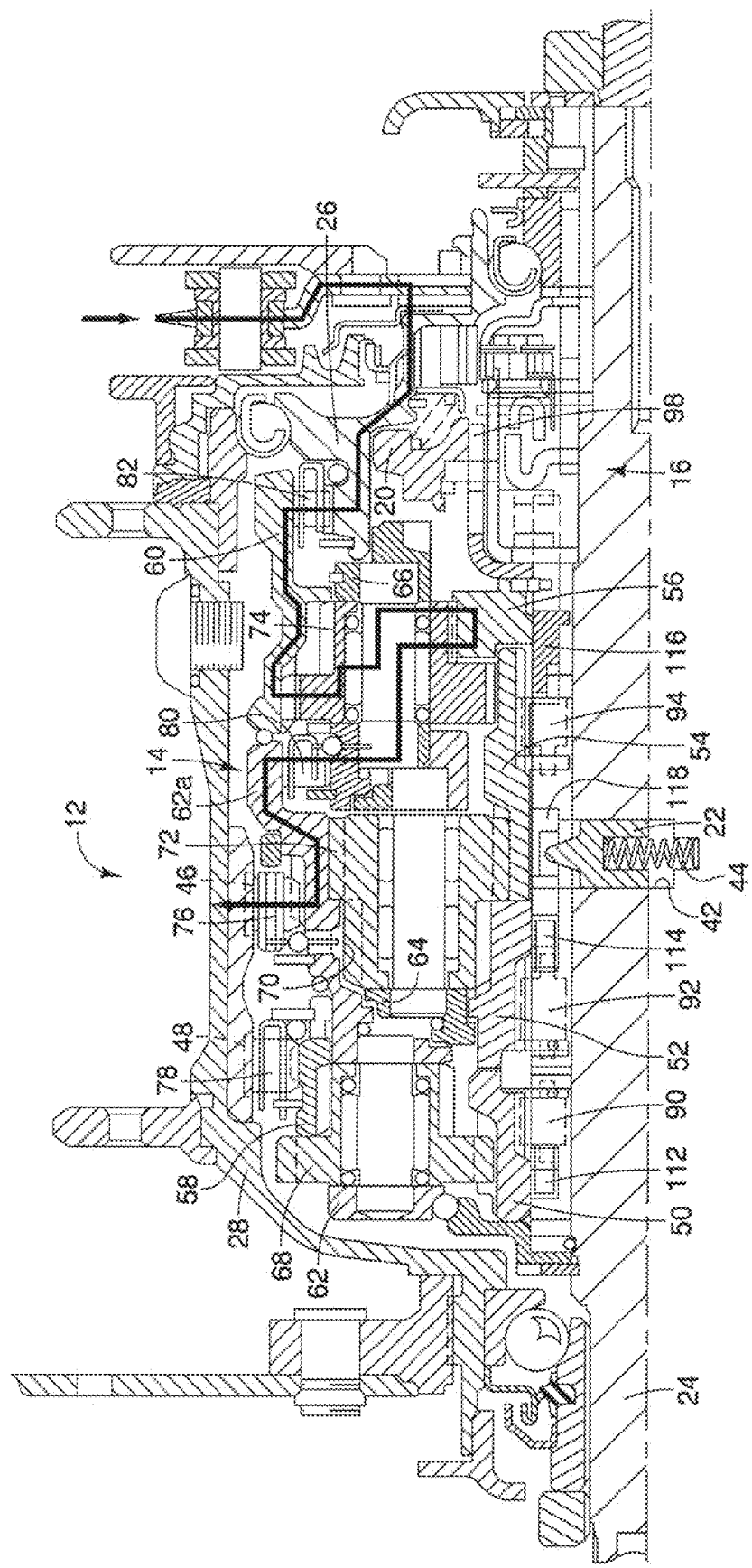
FIG. 7 is a cross-sectional view of a portion of the hub assembly similar to FIG. 2 showing a first power transmission path superimposed over those element of the power transmission assembly that enable the first power transmission in accordance with the first embodiment of the present invention.
Figure 8:
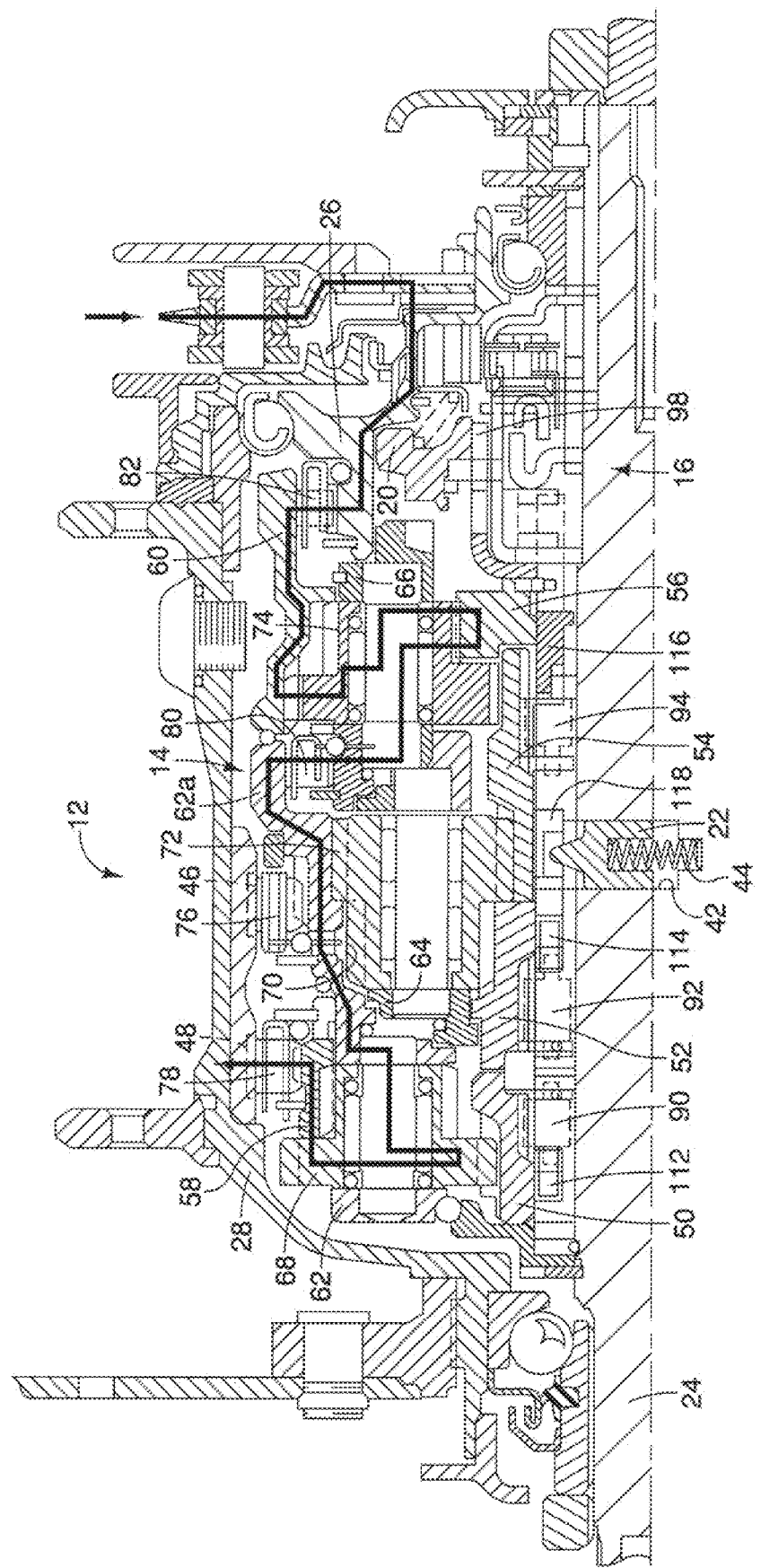
FIG. 8 is a cross-sectional view of a portion of the hub assembly similar to FIG. 2 showing a second power transmission path superimposed over those element of the power transmission assembly that enable the second power transmission in accordance with the first embodiment of the present invention.
Figure 9:
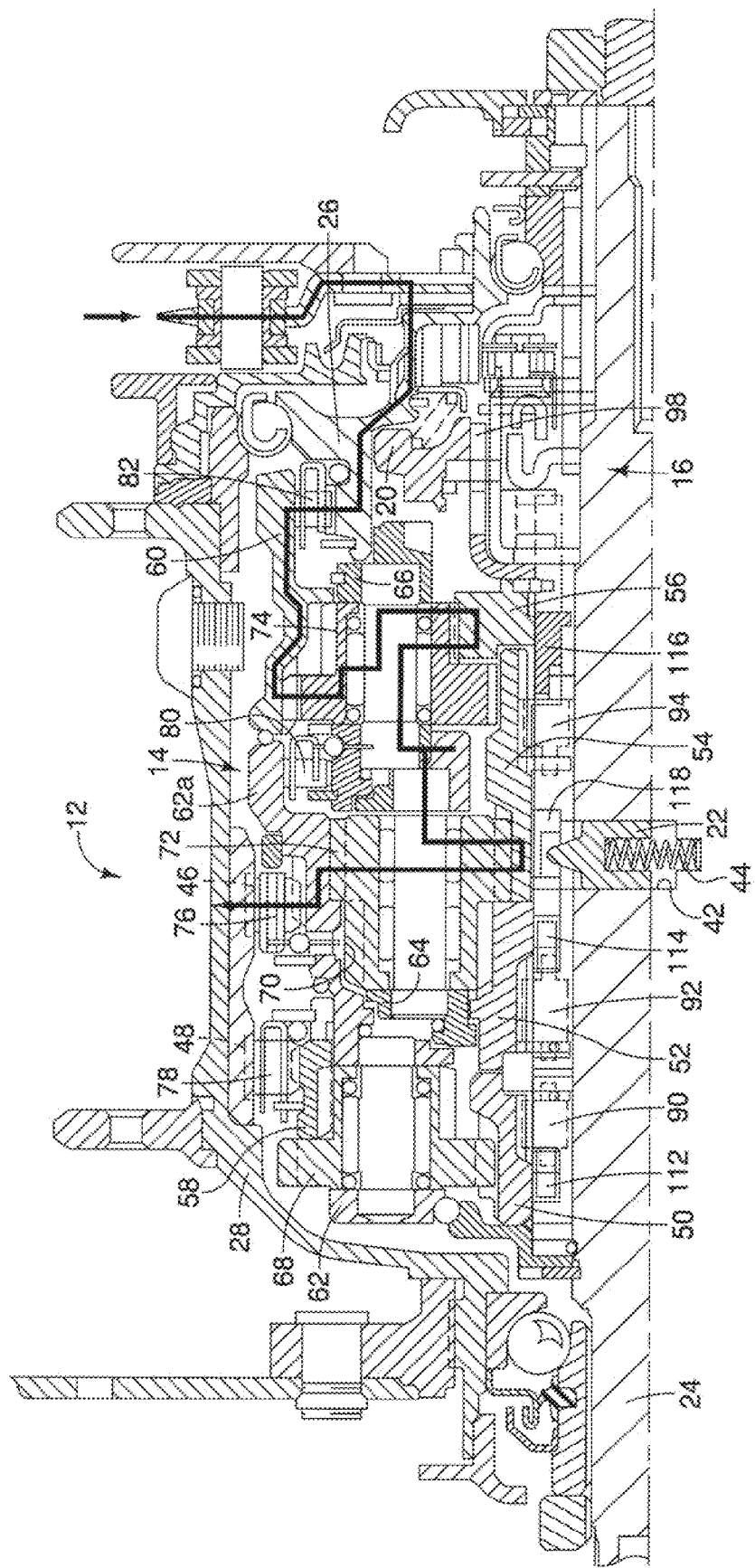
FIG. 9 is a cross-sectional view of a portion of the hub assembly similar to FIG. 2 showing a third power transmission path superimposed over those element of the power transmission assembly that enable the third power transmission in accordance with the first embodiment of the present invention.
Figure 10:
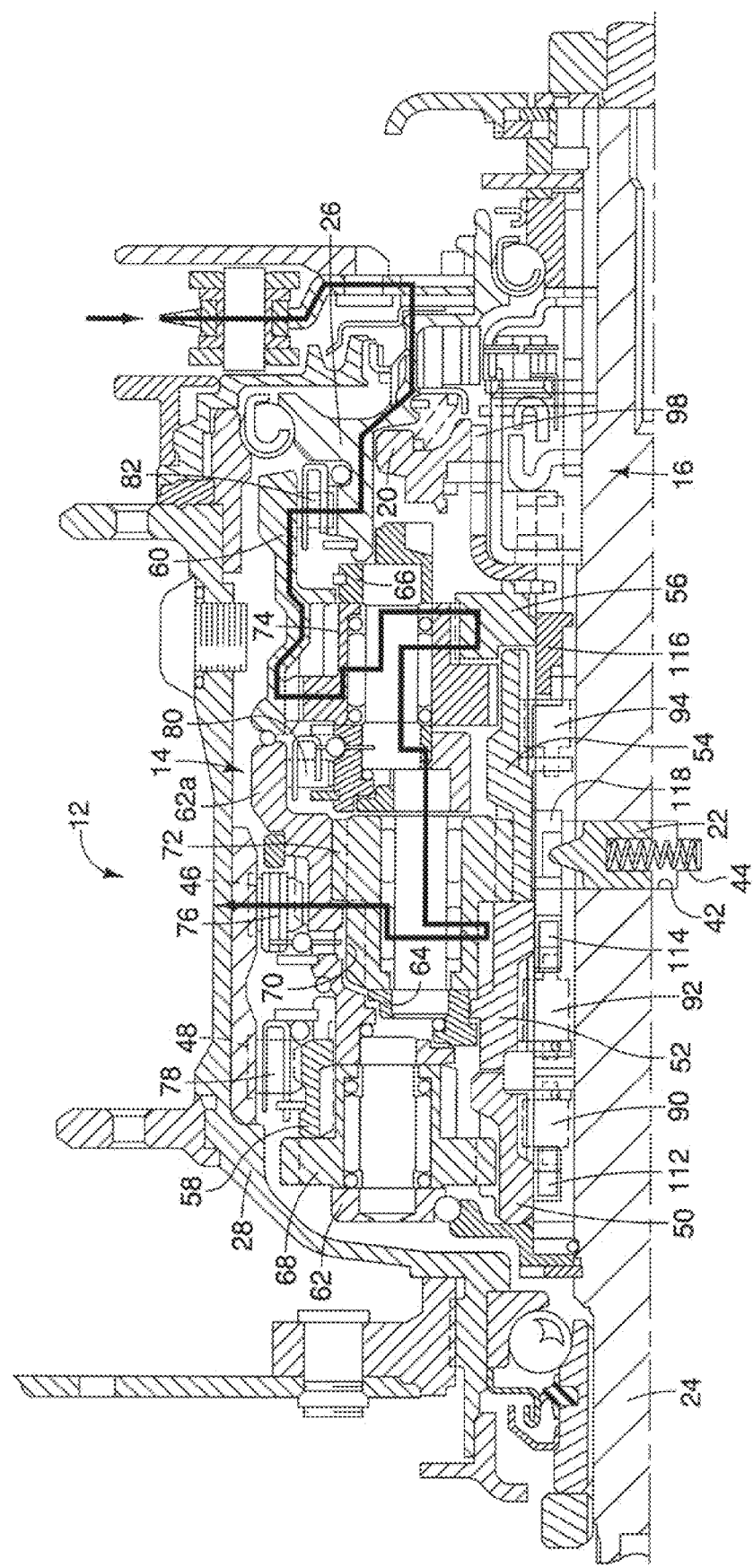
FIG. 10 is a cross-sectional view of a portion of the hub assembly similar to FIG. 2 showing a fourth power transmission path superimposed over those element of the power transmission assembly that enable the Fourth power transmission in accordance with the first embodiment of the present invention.
Figure 11:
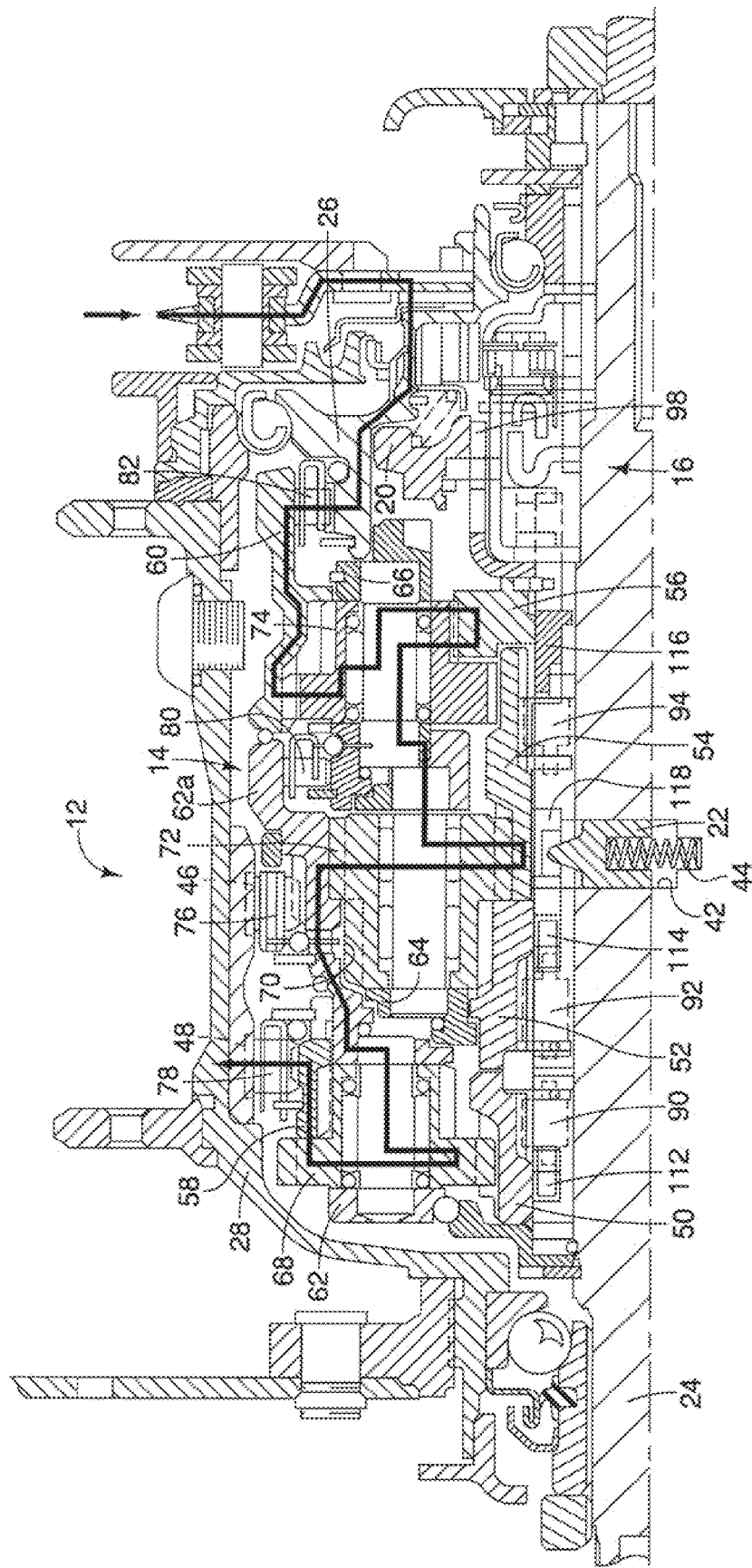
FIG. 11 is a cross-sectional view of a portion of the hub assembly similar to FIG. 2 showing, a fifth power transmission path superimposed over those element of the power transmission assembly that enable the fifth power transmission in accordance with the first embodiment of the present invention.
Figure 12:
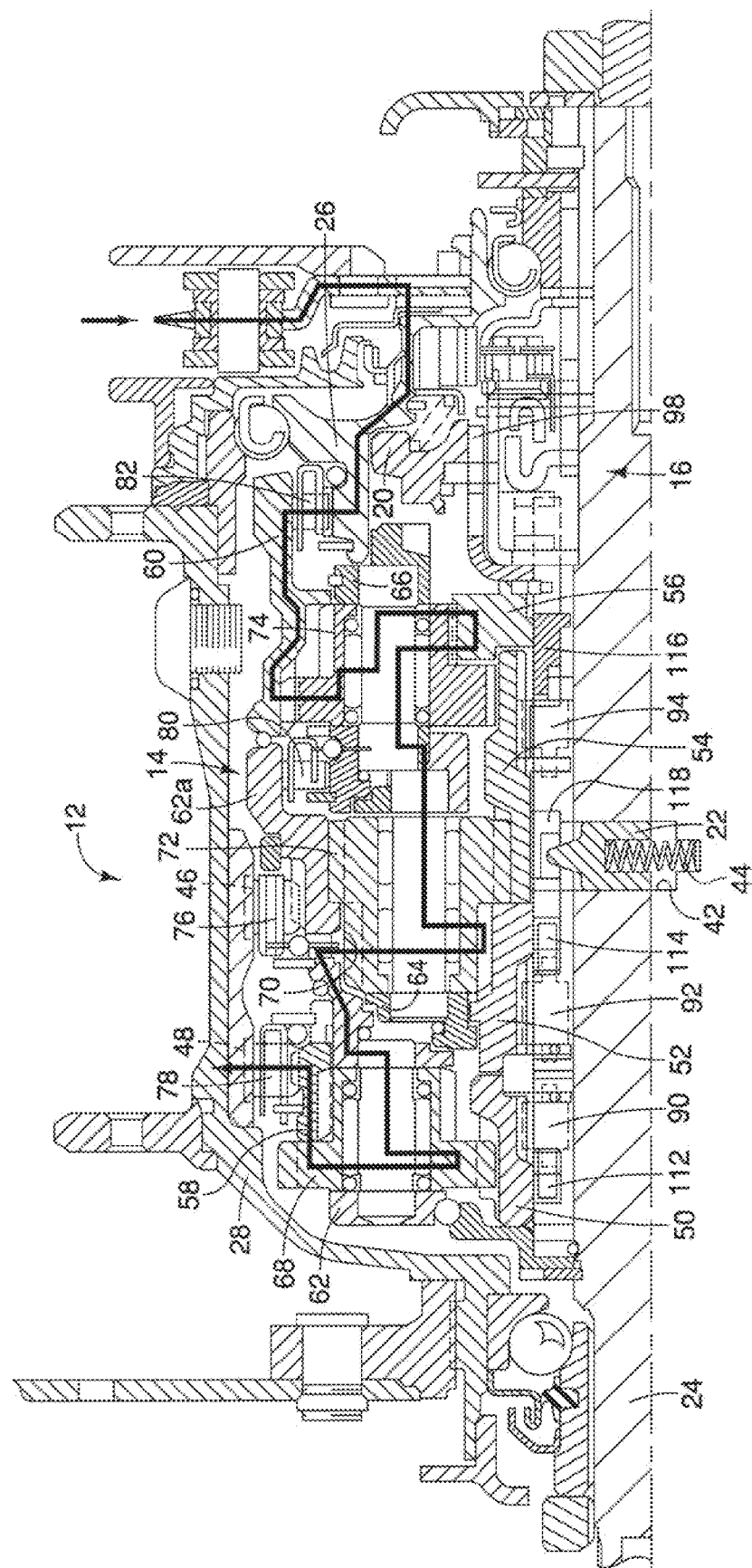
FIG. 12 is a cross-sectional view of a portion of the hub assembly similar to FIG. 2 showing a sixth power transmission path superimposed over those element of the power transmission assembly that enable the sixth power transmission in accordance with the first embodiment of the present invention.
Figure 13:
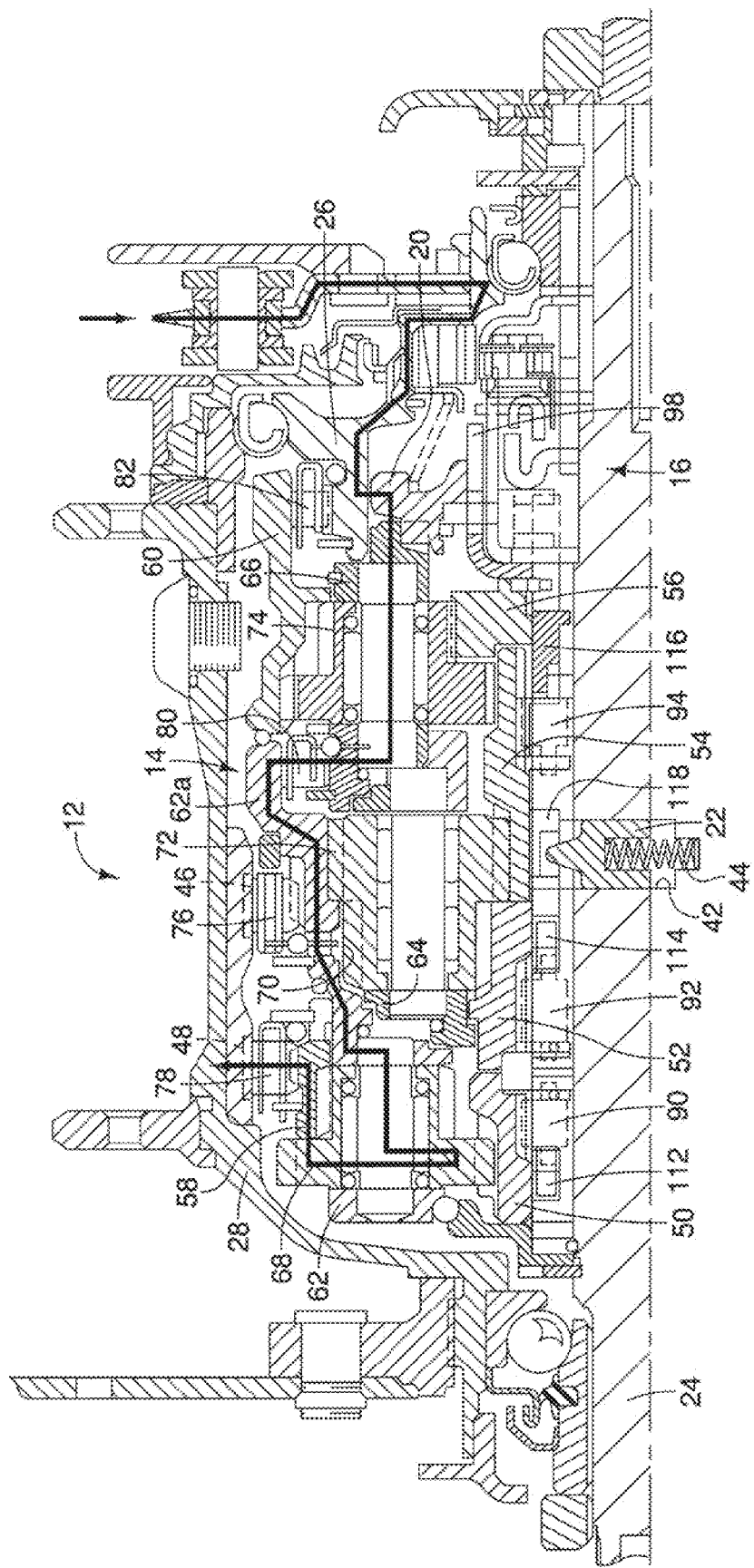
FIG. 13 is a cross-sectional view of a portion of the hub assembly similar to FIG. 2 showing a seventh power transmission path superimposed over those element of the power transmission assembly that enable the seventh power transmission in accordance with the first embodiment of the present invention.
Figure 14:
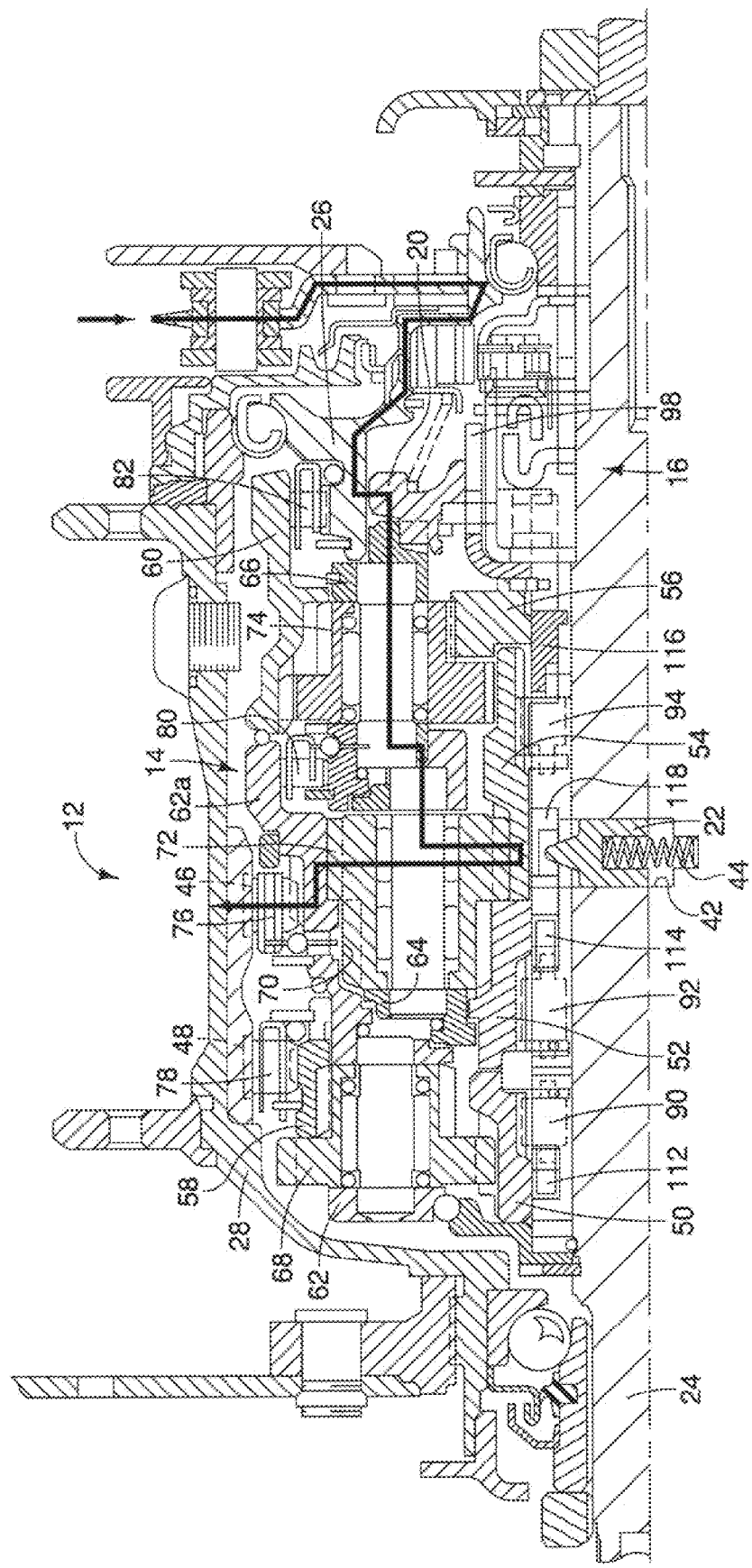
FIG. 14 is a cross-sectional view of a portion of the hub assembly similar to FIG. 2 showing an eighth power transmission path superimposed over those element of the power transmission assembly that enable the eighth power transmission in accordance with the first embodiment of the present invention.
Figure 15:
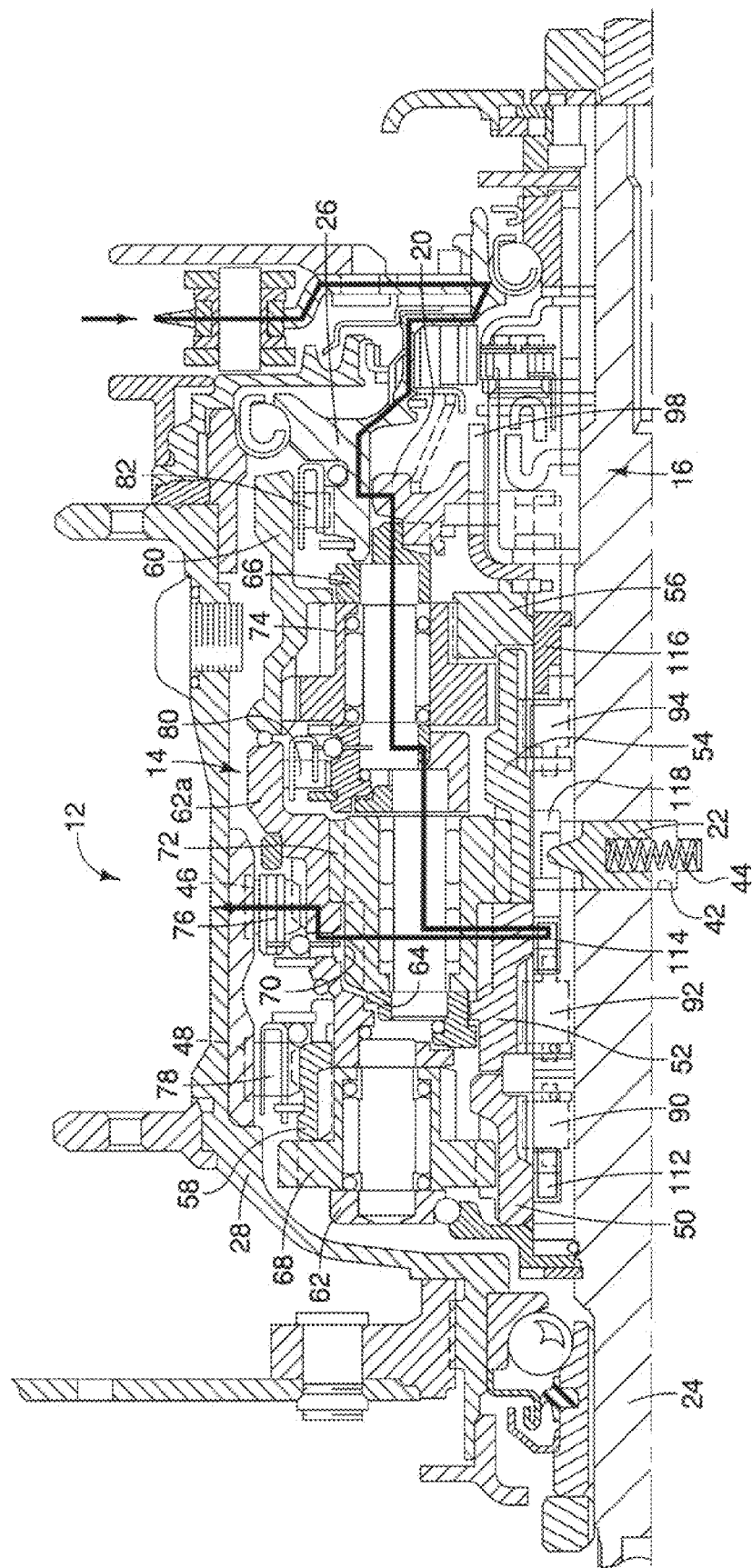
FIG. 15 is a cross-sectional view of a portion of the hub assembly similar to FIG. 2 showing an ninth power transmission path superimposed over those element of the power transmission assembly that enable the eighth power transmission in accordance with the first embodiment of the present invention.
Figure 16:
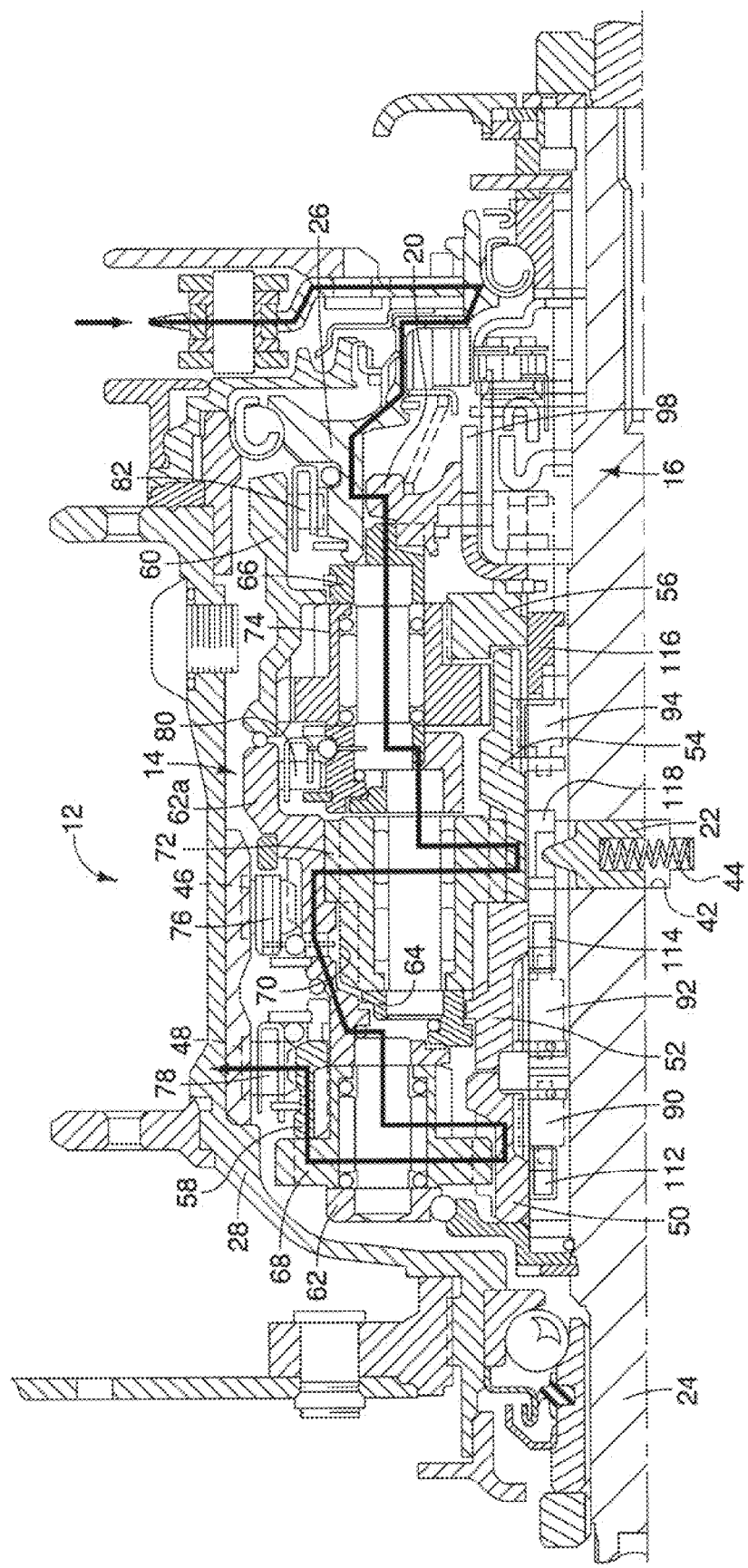
FIG. 16 is a cross-sectional view of a portion of the hub assembly similar to FIG. 2 showing an tenth power transmission path superimposed over those element of the power transmission assembly that enable the eighth power transmission in accordance with the first embodiment of the present invention.
Figure 17:
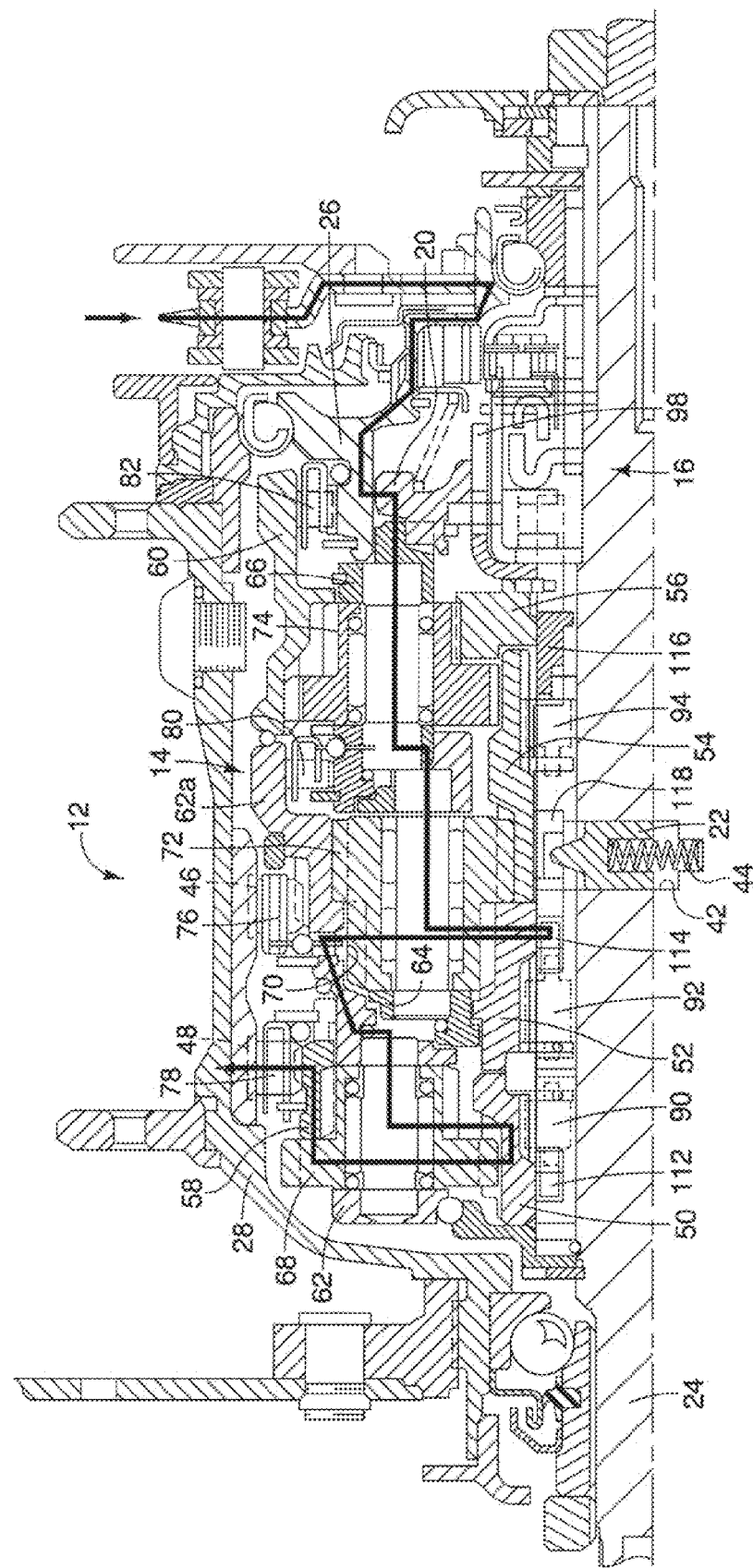
FIG. 17 is a cross-sectional view of a portion of the hub assembly similar to FIG. 2 showing an eleventh power transmission path superimposed over those element of the power transmission assembly that enable the eighth power transmission in accordance with the first embodiment of the present invention.

The positioner 22 and a biasing spring 44 are disposed within the radially extending bore 42, as shown in FIGS. 2 and 5. The positioner 22 is movable in a radial direction within the radially extending bore 42 of the stationary hub axle 24. The positioner 22 includes a base portion with a partially hollow interior such that the biasing spring 44 is disposed within the hollow interior of the base portion and further within the radially extending bore 42 of the stationary hub axle 24 biasing the positioner 22 to move radially outward toward the pawl control member 18. A further description of the positioner 22 and the biasing spring 44 are provided below after a description of the pawl control member 18.

The driver 26 is disposed for rotation about the hub axle 24 in a conventional manner. The hub shell 28 is also disposed for rotation about the hub axle 24 in a conventional manner and is further disposed for rotation about a portion of the driver 26 in a conventional manner.

The driver 26 is mechanically coupled to the chain C (FIG. 1) in a conventional manner thereby being configured to receive torque produced by the pedaling action of a cyclist. The torque from the chain C is transmitted from the driver 26 to the hub shell 28 through the power transmission assembly 14 via a plurality of torque transmission paths that are described in greater detail below.

The hub shell 28 includes a plurality of conventional component and therefore only those features that are unique or relate to the present invention are described herein below. Specifically, the hub shell 28 includes a first set of gear teeth 46 and a second set of gear teeth 48. The first set of gear teeth 46 and a second set of gear teeth 48 are disposed on an inner circumferential surface of the hub shell 28 and are dimensioned to engage respective one-way clutch mechanisms of the power transmission assembly 14 described in greater detail below.

With specific reference to FIG. 2, a brief description of the power transmission assembly 14 is now provided. The power transmission assembly 14 basically includes, among other elements, a first sun gear 50, a second sun gear 52, a third sun gear 54, a fourth sun gear 56, a first ring gear 58, a second ring gear 60, a first planetary gear carrier 62, a second planetary gear carrier 64, a third planetary gear carrier 66, a first planet gear 68, a second planet gear 70, a third planet gear 72, a fourth planet gear 74, a first clutch 76 (a one-way clutch), a second clutch 78 (a one-way clutch, a third clutch 80 (a one-way clutch), a fourth clutch 82 (a one-way clutch) and a fifth clutch, the clutch ring 20. These elements of the power transmission assembly 14 operate in a conventional manner, for instance, as described in U.S. Patent Application Publication Number 2009/0005211 to Tetsuya HINO, published Jan. 1, 2009 and commonly assigned to Shimano Inc. Since operation of the various elements of the power transmission assembly is conventional, further description of these elements is omitted for the sake of brevity.

It should be noted that the first clutch 76 differs from that in US Patent Publication Number 2009/0005211 in that the first clutch 76 of the present invention is located at a radially outer portion 62a of the of the first planetary gear carrier 62 adjacent to the second clutch 78. Further, the first clutch 76 is configured to engage the first set of gear teeth 46 in some of the torque transmission paths and the second clutch 78 is configured to engage the second set of gear teeth 48 in some of the torque transmission paths, as described in greater detail below.

The shift mechanism 16 basically includes, among other elements, a first pawl 90, a second pawl 92, a third pawl 94, a shift key guide 96, a cam member 98, the pawl control member 18 and the positioner 22. The first pawl 90, the second pawl 92 and the third pawl 94 are shown in FIG. 2, and are retained within the pawl receiving groove 30 shown in FIG. 3 in a conventional manner, but are spaced apart from one another in the axial direction, as indicated in FIG. 2.

Operations of the first pawl 90, the second pawl 92 and the third pawl 94 are controlled by positioning the pawl control member 18 at selected ones of a plurality of circumferential positions about the hub axle 24. More specifically, when the first pawl 90 is allowed to operate, the first pawl 90 serves as a one-way clutch that engages gear teeth on the first sun gear 50, thereby preventing the first sun gear 50 from rotating about the hub axle 24. Further, when the second pawl 92 is allowed to operate by the positioning of the pawl control arm 18, the second pawl 92 serves as a one-way clutch that engages gear teeth on the second sun gear 52, thereby preventing the second sun gear 52 from rotating about the hub axle 24. When the third pawl 94 is allowed to operate by the positioning of the pawl control arm 18, the third pawl 94 serves as a one-way clutch that engages gear teeth on the third sun gear 54, thereby preventing the third sun gear 54 from rotating. Since the functions of the first pawl 90, the second pawl 92 and the third pawl 94 are conventional, further description is omitted for the sake of brevity. For example, operation of such pawls is described in greater detail in U.S. Patent Application Publication Number 2009/0005210 to Fukui et al., published Jan. 1, 2009 and commonly assigned to Shimano Inc.

Figure 4:
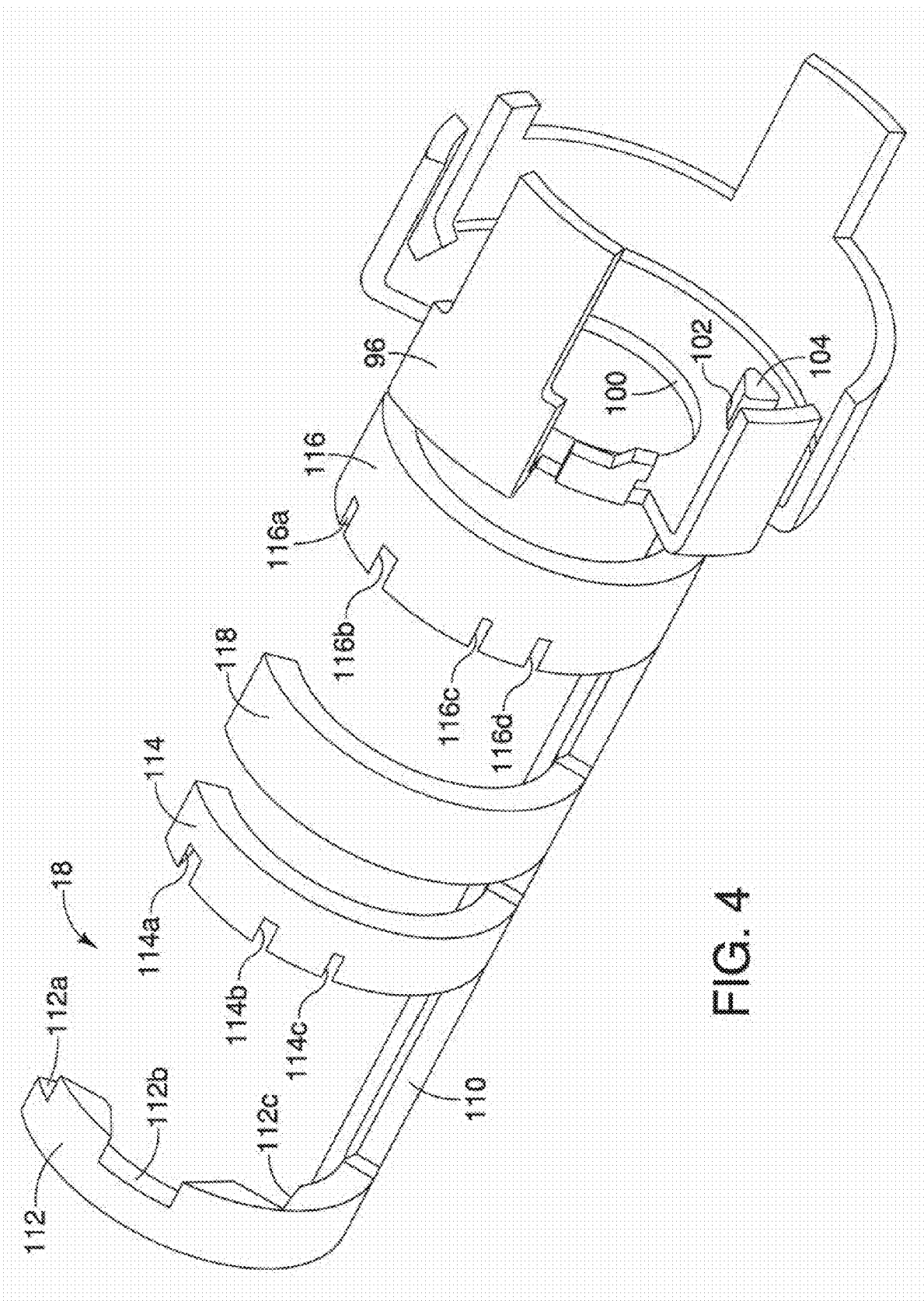
FIG. 4 is a perspective view the pawl control member and the shift key guide shown removed from the hub assembly and the hub axle in accordance with a first embodiment of the present invention.

The shift key guide 96 is depicted in FIGS. 2, 3 and 4. The shift key guide 96 includes central opening 100, and a guide aperture 102 that are best shown in FIGS. 3-5. The shift key guide 96 also includes a plurality of conventional axially extending projections. The central opening 100 is dimensioned to receive the hub axle 24, as indicated in FIG. 3, such that the shift key guide 96 moves circumferentially about the hub axle in a conventional manner. The guide aperture 102 is dimensioned to receive an axial end 104 of the pawl control arm 18, as indicated in FIGS. 3-5. The movement and positioning of the shift key guide 96 is controlled by the cyclist via conventional elements of the shift control mechanism 16 in a conventional manner as described, for example, in U.S. Patent Application Publication Number 2009/0005210 to Fukui et al., and US Patent Publication Number 2009/0005211, both commonly assigned to Shimano Inc.

The cam member 98, as shown in FIG. 2, is also a conventional member that is non-rotatably installed on the hub axle 24 and is described in greater detail in U.S. Patent Application Publication Number 2009/0005210 to Fukui et al., published Jan. 1, 2009 and US Patent Publication Number 2009/0005211, both commonly assigned to Shimano Inc. Therefore, description of the cam member 98 is omitted for the sake of brevity.

A description of the pawl control member 18 is now provided with specific reference to FIGS. 3, 4 and 5. The pawl control member 18 includes a base sleeve 110 (shown best in FIG. 4), the axial end 104 of the base sleeve 110, a first control sleeve 112, a second control sleeve 114, a third control sleeve 116 and a positioning arm 118.

The base sleeve 110 is dimensioned to extend in an axial direction along an outer periphery of the hub axle 24 in a conventional manner. The axial end 104 of the base sleeve 110 is dimensioned to fit into the guide aperture 102, as best shown in FIGS. 3-5. The coupling between the axial end 104 of the base sleeve 110, slaves movement of the pawl control member 18 to the movement of the shift key guide 96. Specifically, as the shift key guide 96 is circumferentially pivoted or rotated about the hub axle 24, the pawl control member 18 moves with the shift key guide 96.

Further, as indicated in FIG. 5, the axial end 104 of the base sleeve 110 is slightly smaller than the guide aperture 102. Hence, there is a small degree of end play P in the circumferential direction between the axial end 104 of the base sleeve of the pawl control member 18 and the shift key guide 96. More specifically, when the shift key guide 96 is rotated about the hub axle 24, the end play P permits is a small degree of independent movement between the shift key guide 96 and the pawl control member 18, as described in greater detail below.

As best shown in FIG. 4, the first control sleeve 112 includes conventional pawl control recesses 112a, 112b and 112c that are positioned and dimensioned to allow operation of the first pawl 90 in a conventional manner. The second control sleeve 114 includes conventional pawl control recesses 114a, 114b and 114c that are dimensioned to allow operation of the second pawl 92 in a conventional manner. As well, the third control sleeve 116 includes conventional pawl control recesses 116a, 116b, 116c and 116d that are dimensioned to allow operation of the third pawl 94 in a conventional manner.

As best shown in FIG. 3, the first control sleeve 112 is disposed within the pawl control arm receiving recess 32 of the hub axle 24, the second control sleeve 114 is disposed within the pawl control arm receiving recess 34 of the hub axle 24 and the third control sleeve 116 is disposed within the pawl control arm receiving recess 36 of the hub axle 24. Further, the positioning arm 118 is disposed within the positioning arm recess 40 of the hub axle 24. Hence, the positioning arm 118 overlays the radially extending bore 42, as indicated in FIG. 6.

In the depicted embodiment, the first control sleeve 112, the second control sleeve 114 and the third control sleeve 116 are dimensioned and configured along with the components of the power transmission assembly 14 to provide eleven (11) different power transmission paths in a manner consistent with the description provided in US Patent Publication Number 2009/0005211. However, it should be understood from the drawings and the description herein that the present invention can be applied to power transmission assemblies having a different number of power transmission paths. For example, some hub assemblies have three power transmission paths, some have 6, 7 or 8 power transmission paths. The present invention can be applied to any of these hub assembly configurations.

As best shown in FIG. 5, the positioning arm 118 includes a circumferentially extending surface 118a (FIG. 6) that faces a circumferentially extending outer surface 24a of the stationary hub axle 24. The positioning arm 118 further includes a plurality of positioning teeth $T_1$ through $T_{11}$ on the circumferentially extending Surface 118a of the positioning arm 118. The positioning teeth $T_1$ through $T_{11}$ are dimensioned and positioned to correspond to the locations of the pawl control recesses 112a, 112b and 112c, the pawl control recesses 114a, 114b and 114c and the pawl control recesses 116a, 116b, 116c and 116d. In other words, each of the positioning teeth $T_1$ through $T_{11}$ is positioned to correspond to a unique one of the torque transmission paths. The positioning teeth $T_1$ through $T_{11}$ can be formed along the entire width of the circumferentially extending surface 118a of the positioning arm 118. Alternatively, the positioning teeth $T_1$ through $T_{11}$ can be formed in a central region of the circumferentially extending surface 118a of the positioning arm 118 or only along one axial end portion thereof.

Figure 6:
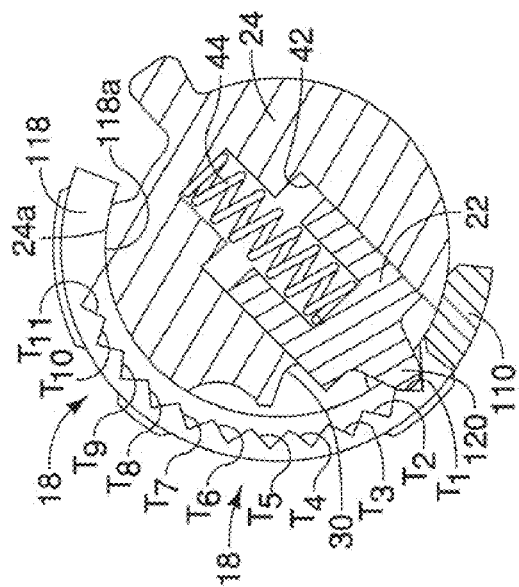
FIG. 6 is a cross-sectional view of the hub axle taken along the line 6-6 is FIG. 3, showing interaction between the positioner and a portion of the pawl control member in accordance with a first embodiment of the present invention.

A more detailed description of the positioner 22 is now provided with specific reference to FIG. 6. The positioner 22 is non-movable in an axial direction relative to the stationary hub axle 24. Instead, the positioner 22 is movable in a radial direction relative to the stationary hub axle 24 and is biased to move radially outward by the spring 44. More specifically, the spring 44 biases positioner 22 into engagement with respective ones of the positioning teeth $T_1$ through $T_{11}$.

During the process of shifting between torque transmission paths, conventional elements of the bicycle 10 (such as manual operation of a shifter mounted to the bicycle handlebar) cause the shifting control mechanism 16 to rotate the shift key guide 96. As the shift key guide 96 is rotated, the pawl control member 18 is also moved in the circumferential direction about the hub axle 24. More specifically, the pawl control member 18 is movable in rotational directions relative to the hub axle 24 to a plurality of orientations, each orientation corresponding to selection of a corresponding, one of the plurality of power transmission paths of the power transmission mechanism 14. Each of the positioning teeth $T_1$ through $T_{11}$ are positioned to correspond to a respective one of the power transmission paths. The positioner 22 is disposed to engage each of the positioning teeth $T_1$ through $T_{11}$ urging the pawl control member 18 to remain at any selected one of the orientations and hence the positioner 22 serves to retain the pawl control member 18 in the selected torque transmission path.

More specifically, the positioner 22 includes a distal end 120 dimensioned and aligned for contact with each one of the positioning teeth $T_1$ through $T_{11}$ of the positioning arm 118 of the pawl control member 18. As shown in FIG. 5, the distal end 120 has a pair of inclined flat surfaces having an inverted V-shape, and the positioning teeth $T_1$ through $T_{11}$ of the pawl control member 18 have complimentary inclined flat surfaces such that contact between the positioner 22 and the positioning teeth $T_1$ through $T_{11}$ provides precise positioning of the pawl control member 18.

The end play P (indicated in FIG. 5) allows for a small degree of movement between the shift key guide 96 and the pawl control member 18. Such movement permits engagement between the positioner 22 and a respective one of the positioning teeth $T_1$ through $T_{11}$ to bias the pawl control member 18 to move to a predetermined position corresponding to the selected torque transmission path. In other words, the end play P provides a tolerance that allows the pawl control member 18 to move a small angle (if necessary) in response to the spring biasing force on the positioner 22 to properly position the pawl control member 18.

The positioning teeth $T_1$ through $T_{11}$ are precisely located relative to the pawl control recesses 112a, 112b and 112c, the pawl control recesses 114a, 114b and 114c and the pawl control recesses 116a, 116b, 116c and 116d such that engagement between the positioner 22 and the positioning teeth $T_1$ through $T_{11}$ ensures proper alignment of the effected components of the power transmission assembly 14. Hence, each of the torque transmission paths can be reliably selected and maintained.

In order to more fully appreciate the precise corresponding locations of the positioning teeth $T_1$ through $T_{11}$ and the pawl control recesses 112a, 112b and 112c, the pawl control recesses 114a, 114b and 114c and the pawl control recesses 116a, 116b. 116c and 116d, the Tables 1 and 2 (below) are provided indicating operation of respective elements of the power transmission assembly 14 to achieve each of the respective torque transmission paths.

Further, the movement of the shift key guide 96 also urges a portion of the clutch ring 20 to contact the cam member 98 in a conventional manlier. Specifically, depending upon the position of the shift key guide 96 (and the pawl control member 18), the clutch ring 20 moves between a disengaged position depicted in FIGS. 7-12 and an engaged position positioned depicted in FIGS. 2 and 13-17. In the engaged position, the clutch ring 20 provides direct torque transmission between the driver 26 and the third planetary gear carrier 66.

Table 1 below tabulates the operation or condition (free wheeling or locked) of the various elements controlled by positioning of the shift key guide 96 and the pawl control member 18 of the power transmission assembly 14 for each respective one of the respective torque transmission paths. Table 1 also correlates the corresponding one of the positioning teeth $T_1$ through $T_{11}$ engaged by the positioner 22 and the respective torque transmission path (which corresponds to a unique gear ratio).

TABLE 1

| Torque Transmission Path (Positioning Tooth, Drawing) | Clutch 20 | First Sun Gear 50 | Second Sun Gear 52 | Third Sun Gear 54 |
|---|---|---|---|---|
| 1 ($T_1$, FIG. 7) | Disengaged | Free | Free | Free |
| 2 ($T_2$, FIG. 8) | Disengaged | Locked | Free | Free |
| 3 ($T_3$, FIG. 9) | Disengaged | Free | Free | Locked |
| 4 ($T_4$, FIG. 10) | Disengaged | Free | Locked | Free |
| 5 ($T_5$, FIG. 11) | Disengaged | Locked | Free | Locked |
| 6 ($T_6$, FIG. 12) | Disengaged | Locked | Locked | Free |
| 7 ($T_7$, FIG. 13) | Engaged | Locked | Free | Free |
| 8 ($T_8$, FIG. 14) | Engaged | Free | Free | Locked |
| 9 ($T_9$, FIG. 15) | Engaged | Free | Locked | Free |
| 10 ($T_{10}$, FIG. 16) | Engaged | Locked | Free | Locked |
| 11 ($T_{11}$, FIG. 17) | Engaged | Locked | Locked | Free |

In Table 2 below, the specific elements that are required for transmission of torque in each of the respective torque transmission paths is further indicated.

TABLE 2

Torque Transmission Path

Figure 18:
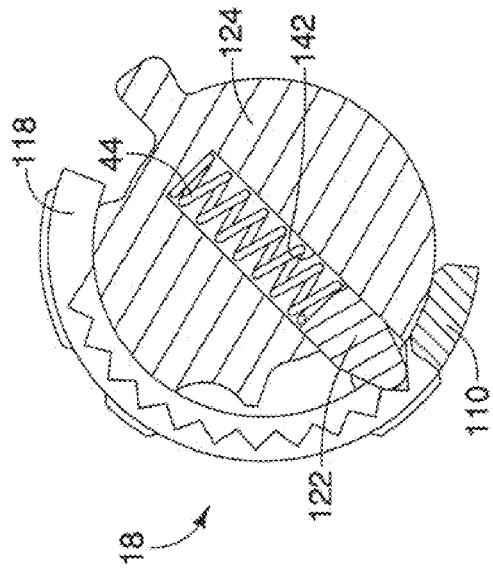
FIG. 18 is a cross-sectional view of the hub axle similar to FIG. 6, showing interaction between a positioner and a portion of the pawl control member in accordance with a second embodiment of the present invention.

1. Driver - 4th clutch 82 - 2nd ring gear 60 - (4th planet gear 74 rotates around 4th sun gear 56) - 3rd planetary gear carrier 66- 3rd clutch 80 - 1st planetary carrier 62 - 1st clutch 76 - Hub Shell
2. Driver - 4th clutch 82 - 2nd ring gear 60 - (4th planet gear 74 rotates around 4th sun gear 56) - 3rd planetary gear carrier 66 - 3rd clutch 80 - 1st planetary carrier 62 - (1st planet gear 68 rotates around 1st sun gear 50) - 1st ring gear 58 - 2nd clutch 78 - Hub Shell
3. Driver - 4th clutch 82 - 2nd ring gear 60 - (4th planet gear 74 rotates around 4th sun gear 56) - 3rd planetary gear carrier 66 - 2nd planetary gear carrier 64 - (2nd planet gear 70 rotates around 2nd sun gear 52) - 1st planetary gear carrier 62 - 1st clutch 76 - Hub Shell
4. Driver - 4th clutch 82 - 2nd ring gear 60 - (4th planet gear 74 rotates around 4th sun gear 56) - 3rd planetary gear carrier 66 - 2nd planetary gear carrier 64 - (2nd planet gear 70 rotates around 2nd sun gear 52) - 1st planetary gear carrier 62 - 1st clutch 76 - Hub Shell
5. Driver - 4th clutch 82 - 2nd ring gear 60 - (4th planet gear 74 rotates around 4th sun gear 56) - 3rd planetary gear carrier 66 - 2nd planetary gear carrier 64 - (3rd planet gear 72 rotates around 3rd sun gear 54) - 1st planetary carrier 62 - (1st planet gear 68 rotates around 1st sun gear 50) - 1st ring gear 58 - 2nd clutch 78 - Hub Shell
6. Driver - 4th clutch 82 - 2nd ring gear 60 - (4th planet gear 74 rotates around 4th sun gear 56) - 3rd planetary gear carrier 66 - 2nd planetary gear carrier 64 - (2nd planet gear 70 rotates around 2nd sun gear 52) - 1st planetary carrier 62 - (1st planet gear 68 rotates around 1st sun gear 50) - 1st ring gear 58 - 2nd clutch 78 - Hub Shell
7. Driver - clutch ring 20 - 3rd planetary gear carrier 66 - 3rd clutch 80- 1st planetary carrier 62 - (1st planet gear 68 rotates around 1st sun gear 50) - 1st ring gear 58 - 2nd clutch 78 - Hub Shell
8. Driver - clutch ring 20 - 3rd planetary gear carrier 66 - 2nd planetary gear carrier 64 - (3rd planet gear 72 rotates around 3rd sun gear 54) - 1st planetary carrier 62 - 1st clutch 76 - Hub Shell
9. Driver - clutch ring 20 - 3rd planetary gear carrier 66 - 2nd planetary gear carrier 64 - (2nd planet gear 70 rotates around 2nd sun gear 52) - 1st planetary gear carrier 62 - 1st clutch 76 - Hub Shell
10. Driver - clutch ring 20 - 3rd planetary gear carrier 66 - 2nd planetary gear carrier 64 - (3rd planet gear 72 rotates around 3rd sun gear 54) - 1st planetary carrier 62 - (1st planet gear 68 rotates around 1st sun gear 50) - 1st ring gear 58 - 2nd clutch 78 - Hub Shell
11. Driver - clutch ring 20 - 3rd planetary gear carrier 66 - 2nd planetary gear carrier 64 - (2nd planet gear 70 rotates around 2nd sun gear 52) - 1st planetary gear carrier 62 - (1st planet gear 68 rotates around 1st sun gear 50) - 1st ring gear 58 - 2nd clutch 78 - Hub Shell Second Embodiment Referring now to FIG. 18, a positioner 122 and a hub axle 124 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The hub axle 124 is identical to the hub axle 24 with all corresponding Features except that the radially extending bore 42 has been replace with a radially extending bore 142 that has a diameter that is smaller than the radially extending bore 42 of the first embodiment. The positioner 22 of the first embodiment has been replace with the positioner 122 that has a diameter smaller than that of the positioner 22. However, operation and function of the positioner 122 is the same as the positioner 22 with respect to positioning of the pawl control member 18.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" When used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing fi-o the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A multi-speed internal bicycle hub transmission assembly comprising:
   a stationary hub axle including a positioner that is movable in a radial direction relative to the stationary hub axle;
   a driver rotatably supported to the hub axle;
   a hub shell rotatably supported to the hub axle;
   a power transmission mechanism operably disposed between the driver and the hub shell for transmitting rotational power from the driver to the hub shell through a plurality of power transmission paths; and
   a shift control mechanism including a pawl control member movable in rotational directions relative to the hub axle to a plurality of orientations, each orientation corresponding to selection of a corresponding one of the plurality of power transmission paths of the power transmission mechanism, the positioner being disposed to urge the pawl control member to remain at any selected one of the orientations.

2. The multi-speed internal bicycle hub transmission assembly according to claim 1 wherein
   the stationary hub axle includes a radially extending bore dimensioned to receive the positioner.

3. The multi-speed internal bicycle hub transmission assembly according to claim 2 wherein
   the positioner includes a base portion that is movable in the radial direction within the radially extending bore of the stationary hub axle.

4. The multi-speed internal bicycle hub transmission assembly according to claim 3 wherein
   the positioner includes a biasing spring disposed on the base portion of the positioner within the radially extending bore of the stationary hub axle biasing the positioner to move radially outward toward the pawl control member.

5. The multi-speed internal bicycle hub transmission assembly according to claim 2 wherein
   the positioner includes a biasing spring disposed within the radially extending bore of the stationary hub axle biasing the positioner to move radially outward toward the pawl control member.

6. The multi-speed internal bicycle hub transmission assembly according to claim 2 wherein
   the pawl control member includes a positioning arm that includes a plurality of positioning teeth on a circumferentially extending surface of the positioning arm; and
   the positioner is movable in a radially outward direction relative to the stationary hub axle for contact with the positioning teeth of the positioning arm of the pawl control member.

7. The multi-speed internal bicycle hub transmission assembly according to claim 1 wherein
   the pawl control member includes a positioning arm that includes a plurality of positioning teeth on a circumferentially extending surface of the positioning arm; and
   the positioner is movable in a radially outward direction relative to the stationary hub axle and includes a distal end dimensioned and aligned for contact with the positioning teeth of the positioning arm of the pawl control member.

8. The multi-speed internal bicycle hub transmission assembly according to claim 7 wherein
   the circumferentially extending surface of the positioning arm of the pawl control member faces a circumferentially extending outer surface of the stationary hub axle.

9. The multi-speed internal bicycle hub transmission assembly according to claim 8 wherein
   the pawl control member includes at least one arcuately shaped control sleeve having at least one pawl control surface configured to contact a torque transmitting pawl of the power transmission mechanism, the positioning arm having an arcuate shape corresponding to and approximately parallel to the arcuately shaped control sleeve.

10. The multi-speed internal bicycle hub transmission assembly according to claim 8 wherein
    the pawl control member includes a plurality of arcuately shaped control sleeves each having at least one pawl control surface configured to contact a respective one of a plurality of torque transmitting pawls of the power transmission mechanism, the positioning arm having an arcuate shape corresponding to and approximately parallel to each of the plurality of arcuately shaped control sleeves.

11. The multi-speed internal bicycle hub transmission assembly according to claim 7 wherein the stationary hub axle includes a spring positioned to bias the positioner to move in the radially outward direction.

12. The multi-speed internal bicycle hub transmission assembly according to claim 11 wherein
    the pawl control member includes at least one arcuately shaped control sleeve having at least one pawl control surface configured to contact a torque transmitting pawl of the power transmission mechanism, the positioning arm having an arcuate shape corresponding to and approximately parallel to the arcuately shaped control sleeve.

13. The multi-speed internal bicycle hub transmission assembly according to claim 11 wherein
    the pawl control member includes a plurality of arcuately shaped control sleeves each having at least one pawl control surface configured to contact a respective one of a plurality of torque transmitting pawls of the power transmission mechanism, the positioning arm having an arcuate shape corresponding to and approximately parallel to each of the plurality of arcuately shaped control sleeves.

14. The multi-speed internal bicycle hub transmission assembly according to claim 7 wherein
the positioner includes a distal end configured to engage the plurality of positioning teeth of the positioning arm, the distal end having a pair of inclined flat surfaces having an inverted V-shape, and the positioning teeth of the pawl control member have complimentary inclined flat surfaces such that contact between the positioner and positioning teeth provides precise positioning of the pawl control member.

15. The multi-speed internal bicycle hub transmission assembly according to claim 14 wherein
the pawl control member includes at least one arcuately shaped control sleeve having at least one pawl control surface configured to contact a torque transmitting pawl of the power transmission mechanism, the positioning arm having an arcuate shape corresponding to and approximately parallel to the arcuately shaped control sleeve.

16. The multi-speed internal bicycle hub transmission assembly according to claim 14 wherein
the pawl control member includes a plurality of arcuately shaped control sleeves each having at least one pawl control surface configured to contact a respective one of a plurality of torque transmitting pawls of the power transmission mechanism, the positioning arm having an arcuate shape corresponding to and approximately parallel to each of the plurality of arcuately shaped control sleeves.

17. The multi-speed internal bicycle hub transmission assembly according to claim 7 wherein
the pawl control member includes at least one arcuately shaped control sleeve having at least one pawl control surface configured to contact a torque transmitting pawl of the power transmission mechanism, the positioning arm having an arcuate shape corresponding to and approximately parallel to the arcuately shaped control sleeve.

18. The multi-speed internal bicycle hub transmission assembly according to claim 7 wherein
the pawl control member includes a plurality of arcuately shaped control sleeves each having at least one pawl control surface configured to contact a respective one of a plurality of torque transmitting pawls of the power transmission mechanism, the positioning arm having an arcuate shape corresponding to and approximately parallel to each of the plurality of arcuately shaped control sleeves.

* * * * *